United States Patent Office 3,115,388
Patented Dec. 24, 1963

3,115,388
HYDROMETALLURGICAL PROCESS FOR THE
RECOVERY OF URANIUM
Mayer B. Goren, Denver, Colo., assignor to Kerr-McGee
Oil Industries, Inc., a corporation of Delaware
No Drawing. Filed Jan. 28, 1959, Ser. No. 789,510
27 Claims. (Cl. 23—14.5)

This invention relates to the recovery of uranium values from aqueous leach liquors and, in one of its more specific aspects, to the recovery of uranium values from aqueous leach liquors by extraction with a water-insoluble organic amine. The invention further relates to a novel method of stripping uranium values from a water-insoluble uranium loaded organic amine extractant for uranium using an aqueous solution of a water-soluble sulfate as the stripping agent.

It is well known in the hydrometallurgical art that the treatment of uranium ores by leaching with aqueous sulfuric acid, generally in the presence of a small amount of sodium chlorate, manganese dioxide or other suitable oxidizing agent, serves to solubilize to a large extent the uranium content of the ore. In this solubilization scheme, the uranium appears in the leach liquor as uranyl ion ($UO_2^{++}$). Other metals such as iron, aluminum, vanadium, etc., are also solubilized to an extent determined by the conditions of treatment.

The recovery of a relatively pure uranium concentrate from sulfuric acid leach liquor may be achieved in a number of ways. An especially useful and economical process which recently has come into wide use is the solvent extraction of uranium values with water immiscible amine solvents. Such extractants generally comprise a minor proportion, usually below 10%, of an organic amine which is substantially insoluble in water and dilute aqueous acidic solutions but soluble in an inert, water-immiscible, organic, relatively non-polar solvent such as kerosene, light fuel oil, benzene, naphtha, chlorinated hydrocarbons, etc. It has been found that, under proper conditions as will be more fully described hereinafter, the uranium content of the aqueous leach liquor may be transposed essentially quantitatively and with high selectivity from the aqueous leach liquor into the organic amine extractant phase. Physical separation of the two phases affords an uranium-loaded organic solution and, after a sufficient number of contacts with successive quantities of solvent, an uranium-barren raffinate. The chemistry of the extraction process has not been entirely clarified. However, a simplified illustration of the various chemical reactions operative in the above-described uranium recovery scheme is usually set forth as follows:

(1) The uranium is most likely extracted from the aqueous sulfuric acid leach liquor by an ion exchange mechanism, the species of uranium ion active in such an ion exchange mechanism being uranyl sulfate anionic complex such as, for example, $UO_2(SO_4)_2^{--}$.

(2) In order for the reaction to take place to an economical degree of completion, excess sulfate ion must be present in order that the above-mentioned complex may be formed, as governed by the equation $$UO_2SO_4 + SO_4^{--} \rightleftharpoons UO_2(SO_4)_2^{--}$$

In the absence of a substantial excess of sulfate ion, the extraction by the organic amine solvent is very poor.

(3) The reaction between the organic amine extractant which is present in the solvent phase either as free amine or the amine sulfate and the uranium anionic complex may be expressed in a simplified manner as given below in Equation 1:

(1)
$$2R_3\text{—}N + UO_2SO_4 + 2H^+ + SO_4^{--} \rightleftharpoons [R_3\text{—}NH]_2.UO_2(SO_4)_2$$
(Solvent soluble)   (Water soluble)   (Solvent soluble)

In Equation 1 above and Equation 2 to be given hereinafter, as well as in subsequent equations, the condensed formula for the amine may be given as $R_3N$. However, it is not necessary that the amine be a tri-alkyl substituted amine. Instead, it may be a primary or secondary amine in many instances provided the substituent carbon chains are long enough to confer water-insoluble and organic solvent-soluble properties which are essential characteristics of suitable organic amine extractant. Thus, R in the formula $R_3N$ may be either an alkyl group or hydrogen.

(4) In order to recover uranium values from the organic phase, the practice of "stripping" the organic phase with a suitable aqueous stripping solution is employed. In accordance with prior art practice, either neutral or slightly acidic nitrate or chloride solutions are used. The nitrate or chloride is usually present as the sodium salt. The reaction governing stripping of uranium values from the uranium loaded organic phase is illustrated below by Equation 2:

(2)
$$(R_3\text{—}NH)_2.UO_2(SO_4)_2 + 2NaCl \rightleftharpoons$$
(Solvent soluble)   (Water soluble)
$$2R_3NH.Cl + Na_2SO_4 + UO_2SO_4$$
(Solvent Soluble)   (Water soluble)

If chloride stripping is being practiced, when the strip liquor is about 5 to 6 molar or higher in chloride ion, the uranyl sulfate anionic complex is stripped from the solvent and then converted into an uranyl chloride anionic complex. This complex, in turn, is strongly complexed by the amine and extremely low stripping efficiency results with the solvent remaining loaded with uranium but as a chloride complex rather than the original sulfate complex.

Consideration of the above and especially Equations 1 and 2 leads to the following conclusions:

(1) The presence of excess sulfate in a uranium bearing sulfate leach liquor is essential for the extraction of the uranyl sulfate complex.

(2) In a chloride stripping system, high chloride concentrations in the strip solution lead to very tight absorption of the uranium by the organic amine extractant with the result that stripping efficiency becomes very low and in some instances essentially ineffective. This is true even though an aqueous chloride solution at low levels of chloride ion concentration is ordinarily an excellent stripping solution.

(3) The presence of small amounts of chloride or nitrate in a uranium bearing sulfate leach liquor would be deleterious to the extraction process since weak chloride solutions such as one molar or less are very effective as stripping agents.

(4) The presence of sulfate ion in the chloride strip liquor would be deleterious to the stripping operation since sulfate ion promotes formation of the uranium anionic complex which is strongly absorbed by the organic amine extractant.

As is well known, the above conclusions have been largely proven correct experimentally and conventional practice is dependent upon maintaining adequate sulfate loading in the pregnant uranium leach liquor, the leach liquor substantially free of chloride ion, nitrate ion or other "stripping" ions, and the strip solution substantially free of sulfate for the reasons outlined above.

Barren leach liquor from the solvent extraction step contains considerable amounts of free acid and ferric iron, the latter being useful as an oxidant in the uranium solubilization step. In addition, the barren leach liquor represents large volumes of water and a very substantial reduction in the amount of fresh water demanded by the leach system could be achieved if the barren leach liquor could be recycled in the system. This would result in a very substantial saving in actual practice since a large proportion of the processing of uranium ores is effected in arid areas. Thus, for economic reasons which are readily apparent, it would be highly desirable to be able to utilize uranium barren leach liquor by recycling it to the ore leaching step. Other considerations, e.g., the presence in the ore of less than economical quantities of other desirable secondary metals such as small quantities of vanadium make it highly desirable to recycle uranium barren leach liquor to the leach circuit until the concentrations of the secondary metals attain levels at which it becomes economical to treat the liquor for recovery of such substances.

The organic amine solvent which has been stripped of uranium in the conventional operation issues from the stripping section in the form of a solvent soluble alkyl ammonium chloride salt in a chloride system or nitrate in a nitrate system. When recycled to the extraction circuit, the organic amine solvent releases an equivalent of chloride to the leach liquor for every equivalent of uranyl sulfate complex which it extracts. As a result, if the barren leach liquor is recycled to the leaching step, the chloride concentration of the leach liquor will rise and continue to rise until the chloride concentration reaches intolerable levels. At such levels, the chloride content of the leach liquor markedly interferes with the uranium solvent extraction process and the chloride-containing acidic liquors pose serious corrosion problems which greatly increase the first cost of equipment and upkeep. Although the corrosion problems may be alleviated somewhat by utilization of a nitrate strip, in addition to being a more expensive stripping agent, nitrate ion is even more deleterious toward efficient solvent extraction than is chloride ion. The build-up of chloride or nitrate stripping ion in recycling leach liquor may be reduced by converting the organic amine nitrate or chloride to the free base. This may be accomplished by contacting the same with ammonia, sodium carbonate or sodium hydroxide before the stripped organic amine solvent is returned to the extraction circuit. However, it will be readily appreciated that this is an expensive treatment since an equivalent of base is required for an equivalent of chloride or nitrate to be removed.

Although nitrate ion is a very efficient stripping agent, there are valid reasons for avoiding nitrate where possible. In addition to its high cost, build-up of nitrate ion in recycling leach liquor is particularly deleterious to the extraction step. In fact, the mere contacting of a nitrate-free uranium leach liquor with the nitrate form of the organic amine solvent extractant results in poorer distribution of uranium values to the organic amine solvent than when it is in the free base or even chloride form. Discarding waste nitrate-containing aqueous solutions can result in serious contamination of ground water and water-bearing formations. Thus, disposal of nitrate-bearing solutions often is a serious problem and conventional practice largely favors the use of chloride strip solutions rather than nitrate strip solutions. However, chloride strip solutions are not satisfactory for reasons given above, and for the additional reason that precipitation of ammonium or metal diuranates affords a product heavily contaminated with chloride which requires extensive washing in order to reduce the contaminate chloride to a very low level which meets the strict specifications for chloride.

In view of the foregoing, conventional stripping operations currently being practiced all have the following limitations:

(1) During chloride or nitrate stripping, sulfate is introduced into the strip solution so that recycle of the strip solution after the uranium has been precipitated therefrom may promote inefficient operation. In addition, recycled strip solution must be fortified with chloride or nitrate stripping salts since these are lost to the organic amine extractant upon stripping of the uranium.

(2) During the extraction step, the organic amine extractant releases an equivalent of chloride or nitrate to the uranium leach liquor for each equivalent of uranyl sulfate complex absorbed. In nitrate stripping systems, even the small amount introduced during the first stripping pass is deleterious. In chloride stripping systems, the effect of chloride is not so pronounced but nevertheless it is highly undesirable.

(3) Recycling of leach liquors in which chloride is constantly building up to objectionable levels results in two problems. For example, eventually the chloride level is sufficiently high so as to markedly interfere with the solvent extraction process and, in addition, corrosion problems are presented. Accordingly, the desirable practice of recycling barren leach liquors for the purpose of achieving economy in acid, oxidant and water consumption is prevented. This has a further disadvantage of not allowing build-up in the recycled leach liquor of vanadium or other desirable secondary metals present in less than economical amounts in the ore so that it is uneconomical to recover them as valuable byproducts.

(4) Rigid chloride specifications for uranium concentrates demand that extensive washing follow precipitation of the concentrate from chloride liquors. Accordingly, if a satisfactory reagent other than chloride or nitrate could be used as a stripping agent, the rigid chloride specification for uranium may be met in every instance without extensive washing requirements.

It is an object of the present invention to provide a novel method of stripping uranium-loaded organic amine extractants which avoids the problems enumerated above.

It is a further object of the present invention to provide a novel method of stripping uranium-loaded organic amine extractants wherein the stripping solution may be recycled over an extended period of time.

It is still a further object of the present invention to provide a novel method of stripping uranium from uranium-loaded organic amine extractants by means of a reagent which does not introduce deleterious ions into the leach liquor, thereby allowing the barren leach liquor to be recycled to the leaching step.

It is still a further object of the present invention to provide a novel method of recovering uranium from its ores which includes a sulfuric acid leach whereby a number of significant benefits may be derived simultaneously such as allowing the stripping solution to be recycled in the stripping circuit to thereby achieve savings in costly stripping materials, the uranium barren leach liquor to be recycled in the leach circuit to thereby achieve marked savings in acid, oxidant and water, and valuable metals such as vanadium to build up to a relatively high concentration in the leach liquor to thereby allow economical recovery when the concentration has reached a significant level.

It is still a further object of the present invention to provide a method whereby metal sulfate salts may be recovered as a by-product in the above-mentioned methods.

Still other objects and advantages of the present invention will be apparent to those skilled in the art upon reference to the following detailed description and the examples.

While it has generally been accepted that sulfate ion promotes extraction of uranium into the organic amine solvent phase and interferes with stripping into the aqueous stripping solution phase, I have nevertheless made the unexpected discovery that aqueous solutions of sulfates possess excellent properties as stripping agents for uranium bearing organic amine extractants. While the stripping solutions of the present invention are effective at room temperature, they are markedly more effective at moderate to high temperatures and when using moderate to high concentrations of sulfate. Generally speaking, the effect of elevated temperature is considerably more pronounced than the effect of higher concentrations of sulfate, as will be more fully discussed hereinafter and illustrated in the examples.

All water-soluble sulfates are effective, but some are more effective than others. The preferred sulfates are those wherein the cation of the sulfate has a valence less than plus 3. For instance, sodium sulfate, potassium sulfate, ammonium sulfate, and magnesium sulfate are examples of metal sulfates which have been found to be especially effective. The effectiveness of the specific stripping solution selected is dependent to some extent upon the concentration of sulfate ion and the temperature of the stripping solution during the stripping operation. At equal concentrations of sulfate ion and other factors being equal, the nature of the cation of the sulfate has been found to affect the stripping behavior. For example, sulfates containing univalent cations are considerably better as stripping agents than sulfates containing multivalent cations. Thus, sodium sulfate, potassium sulfate and ammonium sulfate exhibit substantially identical stripping characteristics, while magnesium sulfate is somewhat less effective although it may be used to good advantage.

While one important embodiment of the present invention is primarily concerned with the use of metal sulfate solutions which are neutral or almost neutral, nevertheless small amounts of sulfuric acid may be added thereto to provide an acidified metal sulfate stripping solution. The addition of sulfuric acid to metal sulfate stripping solutions does not appear to be necessary or beneficial in usual operating practices, but it may be found to be useful under extraordinary circumstances or in certain specific processes. Additionally, since inorganic bases such as alkali hydroxides, magnesium oxide or hydroxide, alkali carbonates and ammonium hydroxide are stripping agents which have been found to be beneficial due to their additive stripping effect when used with otherwise all-sulfate stripping solutions, the sulfate stripping solutions of the present invention may be made alkaline by addition of such substances. The cations of the water-soluble sulfates are, preferably, monovalent or divalent. Sulfates having ter- and quadrivalent cations are not effective in practicing the present invention when the recovery of uranium from the stripping solution involves a neutralization step since such cations would be precipitated along with the uranium. However, in instances where the recovery of uranium from the stripping solution does not involve a neutralization step, then such water-soluble metal sulfates may be used in practicing the present invention as may be sulfuric acid.

At given concentrations of soluble metal sulfates and at elevated temperatures, it is possible to achieve essentially quantitative stripping of uranium held in organic amine solven in a few contacts of loaded solvent with fresh or countercurrently advancing stripping solution. At lower temperatures, increasing the number of stages of contact also serves to deplete the organic amine solvent of its uranium content. Often relatively dilute sulfate solutions such as about 0.25 molar are effective at ambient temperatures and especially when the sulfate solution contains a metal sulfate having univalent cations. However, it is preferred to operate with ammonium or alkali metal sulfates having a concentration at least about one molar and preferably higher up to concentrations approaching saturated solutions of the given sulfate salts. Additionally, it is also preferred to operate at an elevated temperature such as at least about 50° C. but higher temperatures up to the boiling point of the solution may be used. Thus, pressurized systems allow much higher temperatures to be reached. When operating under normal atmospheric pressure, the preferred temperature is about 50–85° C. and the preferred concentration of the metal sulfate salt is at least about one molar and up to a saturated solution.

The nature of organic amine solvents for use in extracting uranium in accordance with the present invention is wel known in the art. For example, if a given amine is to find utility in the over-all process of the present invention, it must possess certain qualities which are necessary in order to allow satisfactory economical operation such as good solubility in kerosene, naphtha, benzene, chlorinated solvents, etc., or other suitable diluent carrier vehicles. Furthermore, the amine should not be appreciably soluble in water or in dilute aqueous acids, since otherwise a considerable portion of the relatively expensive organic amine solvent would be lost in both extraction and stripping operations. It should also have a relatively high capacity per unit weight for the uranyl sulfate complex to be absorbed and it should be reasonably stable under the conditions it will encounter during the extraction and stripping operations. Also, its amine salts or complexes such as the chloride, nitrate, sulfate or uranyl sulfate complexes should likewise be insoluble in water or dilute aqueous acids and should possess good solubility in the organic phase, or otherwise should be readily solubilized by the addition to an organic carrier such as kerosene of minor amounts of additive agents such as dodecanol, isodecanol, tributylphosphate, etc. In addition, it should have none or at most a minimal surface activity so that it does not promote emulsification of aqueous and organic phases during extraction or stripping and so that phase disengagement in these operations is rapid and complete. This assures that emulsion formation will not be a problem in the extraction and stripping steps.

In general, all of the foregoing requirements are met in the instance of relatively high molecular weight alkyl substituted amines such as tri-n-alkyl amines where the alkyl groups have at least about six carbon atoms per alkyl group, dialkyl amines where the substituent alkyl groups have from about 8–10 up to about 20–30 carbon atoms per chain, and mono-alkyl amines having molecular weights in the neighborhood of about 250–300, e.g., about 18–30 carbon atoms in the alkyl substituent. The alkyl substituents may be normal or extensively branched, the latter generally conferring better solvent solubility to the amine and its complexes in the organic diluent or carrier. Both branched and normal compounds have, however, found utility in this application. The problem of surface activity which is pronounced for organic amines in contact with aqueous acidic solutions is minimized to very satisfactory levels by "burying" the nitrogen in either numerous groups or else by proper branching of alkyl substituents in such a manner that the nitrogen is largely surrounded by bulky groups. This expedient is not wholly effective in the instance of the alkyl primary amines, and for this reason the alkyl primary amines often are not as useful in practicing the present invention as the secondary and tertiary amines. However, the primary amines are equally effective in all other respects. In view of the above, it is preferred to employ the secondary and tertiary amines as solvents rather than the mono-alkyl primary amines. Such primary, secondary and tertiary amines are commonly referred to as weak base amines.

The solvent mixtures generally comprise a minor part of the organic amine extractant such as 5–10 volume percent, approximately an equal amount or more of relatively inert solubilizing additives such as isodecanol, dodecanol, tributylphosphate, etc., and the remainder a diluent carrier such as a moderate to high flash point kerosene, preferably, or other suitable carrier such as benzene, naphtha, chlorinated solvents, etc. While any suitable diluent carrier may be employed which is not detrimental to the process described herein, some of the latter mentioned carrier diluents are considerably more expensive than readily available high flash point kerosene and are not preferred for economic reasons. Of the various organic amine extractants in use at the present time, it has been found that the tertiary amines are more readily stripped by aqueous metal sulfate stripping solutions than are the secondary organic amine extractants, although the latter may be satisfactorily stripped by increasing the number of stripping stages or employing other factors more favorable to more complete stripping such as higher concentrations of the stripping reagent and/or higher stripping temperatures.

The physical processes by which uranium is extracted from its ores by hydrometallurgical processes involving organic amine-type solvents are well known. The described method in the literature for intimately contacting sulfuric acid leach liquor with organic amine extractants, such as in a prior art mixer-settler, and separating the phases to obtain uranium-loaded organic extractant are satisfactory in practicing the present invention. The stripping operation on the uranium loaded extractant using the aqueous sulfate solutions of the invention also may be carried out in conventional mixer-settler systems and preferably in a number of countercurrent stages. Stripping also may be carried out in true countercurrent fashion in packed towers, columns, etc., whether pulsed or not, in batch mixing, settling and decanting operations. These operations are all well known. It is preferred to carry out the stripping by contacting the uranium-containing organic amine solvent with advancing successive portions of small quantities (5–20 volume percent) of the sulfate stripping solution, preferably at elevated temperatures, under conditions of vigorous agitation to assure adequate mixing for a period of from ½ to 10 minutes followed by residence in a settler for a time sufficient to allow adequate separation of phases to occur. The stripped organic amine phase is advanced to a less loaded strip solution while the uranium-bearing strip solution is advanced to meet more concentrated uranium-bearing organic amine solvent. With a sufficient number of such stages, more than 99% of the uranium content in the solvent may be transferred to the stripping solution. The most concentrated (in uranium) stripping solution may be passed to a precipitation step and conventional practice followed to obtain a precipitated uranium product therefrom, such as by addition of a base such as ammonia, and then the stripping solution may be recycled in the stripping process.

The benefits to be derived from the practice of the present invention may be most easily recognized through consideration of the chemical equations or reactions involved in the extraction-stripping-precipitation cycles as given below, with the preferred stripping agent, i.e., ammonium sulfate, being employed as a stripping reagent and ammonia as the precipitant:

Extraction:

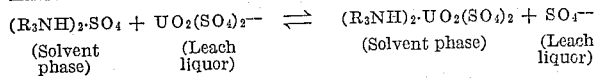

Stripping:

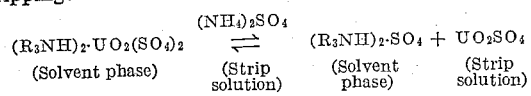

Precipitation:

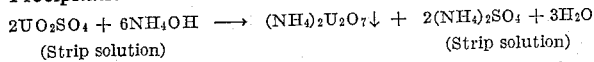

It is apparent from the foregoing that no extraneous ion is transferred from the organic amine solvent to the leach liquor, since only sulfate is involved, and it is further apparent that the ammonium sulfate strip solution does not lose any sulfate to the organic amine solvent. In fact, it becomes richer in sulfate since one mol of sulfate per mol of uranium stripped is added thereto during the stripping operation. It is still further apparent that the precipitation process produces a mol of ammonium sulfate for each mol of uranium precipitated. In the instance where sodium sulfate or magnesium sulfate is employed as the stripping agent, neutralization with sodium hydroxide or magnesium oxide, respectively, would yield the corresponding sulfate salts as valuable by-products. Thus, the process of the present invention allows the recovery of such salts as valuable by-products rather than their loss in discarded waste solutions.

When comparing the process of the present invention, e.g., the specific variant discussed above, with the stripping processes of the prior art, including those discussed herein employing water-soluble metal chlorides or nitrates and the stripping process employing water-soluble metal carbonates disclosed on page 973 of the September 1957 issue of Mining Engineering, it is obvious that the stripping solution of the invention is substantially free of prior art stripping agents for the uranium-loaded solvent extractant such as water-soluble metal chlorides, nitrates and carbonates. Further, when comparing the process of the present invention with the conventional process utilizing chloride stripping, it may be seen that the chloride stripping process requires continuous make-up of stripping agent, contaminates the extracted leach liquor with chloride and corrosion problems are present, prevents large-scale recycling of barren leach liquors, and compels large-scale washing of the product to eliminate chloride contamination; while the sulfate stripping process of the present invention introduces no extraneous anions into the leach liquor, allows indefinite recycling of barren leach liquor, requires no reagent make-up and produces as a valuable by-product the very reagent employed in the strip solution. In order to utilize this latter feature of the present invention to the best advantage, it is preferred to operate with a stripping solution which is substantially saturated at room temperature; also, in addition to using a saturated solution, it is preferred that ammonium sulfate be used to carry out the stripping operation at a temperature of about 50–85° C., ammonium diuranate be precipitated by neutralization of the hot strip liquor with ammonia, and the uranium concentrate be recovered by filtration and displacement washing. The by-product ammonium sulfate is thereby recoverable from the uranium-barren strip liquor by cooling and preferably it is cooled to ambient temperature. The ammonium sulfate is obtained as a pure crystalline product and the mother liquor is fully reconstituted strip solution which may be heated and recycled indefinitely in the stripping process.

The foregoing detailed description and the following specific examples are for purposes of illustration only, and are not intended as limiting to the spirit or scope of the appended claims.

*Example I*

This example describes preparation of the uranium-loaded amine solvents employed in subsequent stripping experiments.

(1) *"Trifatty Amine" solvent.*—Employing a high flash point kerosene (Kerr-McGee Oil Industries "Napoleum 470") as vehicle, 2½ weight percent of General Mills "Trifatty Amine" (a mixed trialkyl amine wherein the alkyl groups contain an average of eight to ten carbon atoms) and 3–4 volume percent of isodecanol as solubilizing agent, were dissolved and contacted with successive portions of an uranyl sulfate solution at a pH of 1.75 until the amine was loaded to a desirable level. Analysis of the loaded solvent indicated it to contain 3.4 g. $U_3O_8$ per liter.

(2) *9D–178 solvent.*—The vehicle and solubilizing agent were the same as in the preceding example except that a secondary amine (Rohm & Haas 9D–178) was employed using 4½–5 weight percent. This amine is described as a dodecenyl-tertiary alkyl amine wherein the tertiary alkyl group is high molecular weight and highly branched, the equivalent weight of the amine being approximately 375. When contacted with a uranyl sulfate solution as in the preceding example, a loaded solvent was obtained which assayed 2.85 g. $U_3O_8$/liter.

(3) *Tri iso octyl amine solvent.*—This solvent was prepared as set forth in the first example with the exception that tri iso octyl amine was substituted for the trifatty amine. The loaded solvent assayed 2.09 g. $U_3O_8$/liter.

Example II

The 9D-178 solvent (loaded to 2.85 g. $U_3O_8$/liter) was examined for stripping with 2 molar ammonium sulfate at ambient (27° C.) and elevated (70-75° C.) temperature by vigorously agitating ten volumes of the organic with 1 volume of the stripping solution for 1 minute, allowing the phase to separate and assaying these for uranium content. In the instance of the low temperature strip, only one contact was made, while an additional four contacts were made with fresh volumes of the stripping solution in the high temperature strip. The following results were obtained:

| Temperature, ° C. | Contact Number | $U_3O_8$ (g./l.) | | $C_{aq}/C_{org}$ |
|---|---|---|---|---|
| | | Aqueous Phase | Organic Phase | |
| 27 | 1 | 1.12 | 2.83 | 0.395 |
| 70-75 | 1 | 11.0 | 1.89 | 5.8 |
| | 2 | 7.3 | | |
| | 3 | 4.3 | | |
| | 4 | 3.0 | | |
| | 5 | 2.2 | .10 | 22 |

Thus it is evident that in one contact at elevated temperature 36% of the uranium was stripped as compared with only 4% at ambient temperature. In five contacts at elevated temperature 97% of the uranium was stripped.

Example III

This example illustrates the behavior of the "Trifatty Amine" solvent loaded to 3.4 g. $U_3O_8$/liter in one-stage contacts with ammonium sulfate solutions of various strengths and at different temperatures. In these tests ten volumes of the loaded organic were contacted with 1 volume of the stripping solution and vigorously agitated for 2 minutes, the phases separated, sampled and analyzed for uranium content. The table below records these data and gives calculated values for the observed stripping coefficients: $U_3O_8$ concentration in the aqueous phase divided by the concentration in the organic phase.

(a) Stripping with 1.0 molar $(NH_4)_2SO_4$:

| Temp. (° C.) | $U_3O_8$ Concentration | | $K=(C_{aq})/(C_{org})$ |
|---|---|---|---|
| | Aqueous Phase | Organic Phase | |
| 32 | 7.27 | 2.78 | 2.62 |
| 45 | 9.98 | 2.49 | 4.0 |
| 65 | 15.12 | 1.97 | 7.7 |
| 85 | 21.89 | 1.30 | 16.8 |
| 100 | 26.14 | 0.86 | 30.4 |

(b) Stripping with 1.5 molar $(NH_4)_2SO_4$:

| Temp. (° C.) | $U_3O_8$ Concentration | | $K=(C_{aq})/(C_{org})$ |
|---|---|---|---|
| | Aqueous Phase | Organic Phase | |
| 29 | 8.63 | 2.51 | 3.4 |
| 45 | 12.17 | 2.22 | 5.5 |
| 65 | 17.40 | 1.71 | 10.2 |
| 85 | 24.96 | 0.97 | 25.7 |
| 100 | 29.3 | 0.54 | 54.3 |

(c) Stripping with 2 molar $(NH_4)_2SO_4$:

| Temp. (° C.) | $U_3O_8$ Concentration | | $K=(C_{aq})/(C_{org})$ |
|---|---|---|---|
| | Aqueous Phase | Organic Phase | |
| 31 | 10.1 | 2.41 | 4.19 |
| 45 | 14.0 | 2.06 | 6.8 |
| 65 | 17.85 | 1.50 | 11.9 |
| 85 | 25.25 | 0.94 | 26.9 |
| 100 | 28.64 | 0.57 | 50.3 |

(d) Stripping with 2.5 molar $(NH_4)_2SO_4$:

| Temp. (° C.) | $U_3O_8$ Concentration | | $K=(C_{aq})/(C_{org})$ |
|---|---|---|---|
| | Aqueous Phase | Organic Phase | |
| 30 | 11.15 | 2.26 | 4.9 |
| 45 | 14.32 | 1.99 | 7.2 |
| 65 | 20.94 | 1.33 | 15.7 |
| 85 | 27.46 | 0.64 | 42.9 |
| 100 | 27.98 | 0.66(?) | 42.4 |

It may be seen from the above data that while significant increases in low temperature stripping efficiency accrue from mere increase of ammonium sulfate concentration (the K-value increasing from 2.6 to 4.9 as the concentration is increased from 1.0 to 2.5 molar) much more impressive increases in stripping efficiency are achieved by merely raising the temperature. For example, approximately a seven-fold increase in K-value is achieved (regardless of the concentration) when the temperature is increased from 30° up to 85° C.

Example IV

This example summarizes the extraction efficiencies obtainable in multi-stage contacting of 10 volumes of loaded "Trifatty Amine" (3.4 g. $U_3O_8$/liter) solvent with successive 1-volume portions of 3.5 molar (saturated) ammonium sulfate at various temperatures.

(a) Stripping at 32° C.:

| Contact No. | $U_3O_8$ Concentration (g./l.) | | Percent $U_3O_8$ Stripped (cumulative) |
|---|---|---|---|
| | Aqueous Phase | Organic Phase | |
| 1 | 13.58 | 2.11 | 38 |
| 2 | 5.84 | 1.46 | 57 |
| 3 | 4.13 | 0.96 | 72 |
| 4 | 2.63 | 0.61 | 82 |
| 5 | 1.88 | 0.35 | 90 |

(b) Stripping at 50° C.:

| Contact No. | $U_3O_8$ Concentration (g./l.) | | Percent $U_3O_8$ Stripped (cumulative) |
|---|---|---|---|
| | Aqueous Phase | Organic Phase | |
| 1 | 18.98 | 1.50 | 56 |
| 2 | 8.21 | 0.68 | 80 |
| 3 | 3.96 | 0.22 | 93.5 |
| 4 | 1.58 | .035 | 99 |
| 5 | 0.37 | .013 | 99.6 |

(c) Stripping at 85° C.:

| Contact No. | $U_3O_8$ Concentration (g./l.) | | Percent $U_3O_8$ Stripped (cumulative) |
|---|---|---|---|
| | Aqueous Phase | Organic Phase | |
| 1 | 29.28 | 0.49 | 86 |
| 2 | 4.43 | 0.038 | 98.9 |
| 3 | 0.20 | 0.014 | 99.6 |
| 4 | 0.06 | 0.002 | 99.94 |

It is thus evident that at low temperature, high stripping efficiency will require considerably more than four stages; at 50° C., 99% stripping is achieved in four stages, while essentially equal stripping (98.9%) is obtained in two stages at 85° C.

Example V

This example illustrates the behavior of the tri isooctyl amine solvent (loaded to 2.1 g. $U_3O_8$/liter) in one-stage contacts with ammonium sulfate solutions of various strengths and at different temperatures. Ten volumes of the loaded organic were equilibrated with one volume of strip solution as in Example III. The data obtained are recorded below:

| Conc. Strip Solution | Temperature (° C.) | $U_3O_8$ Concentration | | $K=(C_{aq})/(C_{org})$ |
|---|---|---|---|---|
| | | Aqueous Phase | Organic Phase | |
| 1. Molar | 32 | 9.04 | 1.25 | 7.2 |
| | 45 | 10.20 | 1.12 | 9.1 |
| | 65 | 13.3 | 0.80 | 16.7 |
| | 85 | 17.6 | 0.78 | 22.6 |
| 1.5 Molar | 32 | 10.7 | 1.06 | 10 |
| | 45 | 11.4 | 0.99 | 11.5 |
| | 65 | 15.6 | 0.58 | 26.9 |
| | 100 | 18.0 | 0.39 | 46.3 |
| 2 Molar | 28 | 10.8 | 1.03 | 10.5 |
| | 45 | 13.3 | 0.83 | 16 |
| | 65 | 14.8 | 0.54 | 27.3 |
| | 85 | 18.6 | 0.28 | 66.5 |
| 2.5 Molar | 30 | 12.1 | 0.89 | 13.6 |
| | 45 | 13.2 | 0.78 | 16.9 |
| | 65 | 16.1 | 0.40 | 40.1 |
| | 85 | 18.8 | 0.22 | 85.2 |

*Example VI*

When 2 M ammonium sulfate solution (equilibrium pH about 4.5) was neutralized with ammonium hydroxide to a pH slightly in excess of 7, qualitative observation indicated it to be a better stripping agent for the Trifatty Amine solvent than was the unneutralized ammonium sulfate. Acidification (to 0.1 N in $H_2SO_4$) of the 2 M ammonium sulfate did not appear to affect the stripping characteristics at high temperatures.

*Example VII*

This example illustrates stripping of the "Trifatty Amine" solvent loaded to 3.4 g. $U_3O_8$/liter with an aqueous solution saturated at 28° C. with sodium sulfate. Extraction efficiencies obtainable in multi-stage contacting often volumes loaded solvent with 1 volume of strip solution contacted for two minutes at various temperatures are given below.

| Temp. (° C.) | Contact No. | $U_3O_8$ Concentration | | Percent $U_3O_8$ Stripped (cumulative) |
|---|---|---|---|---|
| | | Aqueous Phase | Organic Phase | |
| 28 | 1 | 9.14 | 2.51 | 26 |
| | 2 | 5.13 | 1.86 | 45 |
| | 3 | 3.75 | 1.36 | 60 |
| | 4 | 2.50 | 1.01 | 70 |
| 60 | 1 | 15.9 | 1.82 | 46 |
| | 2 | 10.41 | 0.69 | 80 |
| | 3 | 4.55 | 0.18 | 94.7 |
| | 4 | 1.52 | 0.03 | 99 |
| 85 | 1 | 28.01 | 0.70 | 80 |
| | 2 | 6.13 | .076 | 98 |
| | 3 | 0.72 | .005 | 99.8 |
| | 4 | .015 | nil | 100 |

*Example VIII*

This test examines stripping of loaded "Trifatty Amine" solvent with 0.25 molar $Na_2SO_4$ at 85° C. in four successive contacts at organic/aqueous ratios of 10:1.

| Contact No. | $U_3O_8$ Concentration (g./l.) | | Percent $U_3O_8$ Stripped (cumulative) |
|---|---|---|---|
| | Aqueous Phase | Organic Phase | |
| 1 | 12.13 | 2.25 | 34 |
| 2 | 7.17 | 1.42 | 58 |
| 3 | 5.49 | 0.80 | 77 |
| 4 | 3.25 | 0.41 | 88 |

It is thus apparent that even 0.25 molar sodium sulfate at elevated temperature is a considerably better stripping agent than is saturated sodium sulfate at ambient temperature.

*Example IX*

The saturated sodium sulfate solution employed in Example VII was made 0.1 N with sulfuric acid and stripping of Trifatty Amine solvent at 85° C. was examined as in the last part of Example VII.

| Contact No. | $U_3O_8$ Concentration (g./l.) | | Percent $U_3O_8$ Stripped (cumulative) |
|---|---|---|---|
| | Aqueous Phase | Organic Phase | |
| 1 | 25.27 | 0.81 | 77 |
| 2 | 6.81 | 0.14 | 96 |
| 3 | 1.16 | .028 | 99.2 |
| 4 | 0.12 | .003 | 99.9 |

Comparison of these results with those obtained in the last part of Example VII indicates only slight qualitative differences in behavior of the neutral as compared with the acidified strip solution, the former appearing to be slightly more effective.

*Example X*

This example illustrates the multi-stage stripping of the Trifatty Amine solvent with 2 molar $MgSO_4$, the conditions being the same as in Example VII.

| Temp. (° C.) | Contact No. | $U_3O_8$ Concentration | | Percent $U_3O_8$ stripped (cumulative) |
|---|---|---|---|---|
| | | Aqueous Phase | Organic Phase | |
| 23 | 1 | 3.16 | 3.08 | 9 |
| | 2 | 1.96 | 2.94 | 13 |
| | 3 | 1.50 | 2.81 | 17 |
| | 4 | 1.27 | 2.64 | 22 |
| 60 | 1 | 6.71 | 2.63 | 22 |
| | 2 | 4.90 | 2.08 | 39 |
| | 3 | 3.63 | 1.74 | 49 |
| | 4 | 2.80 | 1.38 | 59 |
| 85 | 1 | 15.18 | 2.02 | 41 |
| | 2 | 8.46 | 1.14 | 67 |
| | 3 | 5.24 | 0.55 | 84 |
| | 4 | 2.94 | 0.23 | 93 |

It is thus evident from comparison of the results of this example with the preceding examples that sulfates of univalent cations are somewhat more effective than sulfates of bivalent metals, although at elevated temperatures the latter do possess significant stripping qualities.

What is claimed is:

1. A method of stripping uranium values from a solution of water-insoluble uranium loaded organic weak base amine solvent extractant for uranium, the solvent extractant for uranium being dissolved in a water-insoluble organic diluent therefor, comprising the steps of intimately contacting the solution of uranium-loaded extractant with a stripping solution consisting essentially of at least one water-soluble inorganic sulfate selected from the group consisting of sodium, potassium, magnesium and ammonium sulfates dissolved in water to strip uranium values therefrom and produce stripping solution containing stripped uranium values, the stripping solution being substantially free of a stripping agent for the uranium-loaded solvent extractant selected from the group consisting of water-soluble metal chlorides, nitrates and carbonates, the concentration of the inorganic sulfate in the stripping solution being at least one molar and the stripping solution being at an elevated temperature between about 50° C.

and the boiling point when contacted with the solution of uranium-loaded extractant, and separating stripping solution containing stripped uranium values from the solution of uranium extractant.

2. The method of claim 1 wherein uranium values are recovered from the separated stripping solution and the resulting uranium poor stripping solution is recycled.

3. The method of claim 1 wherein the concentration of the inorganic sulfate in the stripping solution is at least sufficient to saturate the stripping solution at normal room temperature.

4. The method of claim 3 wherein uranium values are recovered from the separated stripping solution and the resulting uranium poor stripping solution is recycled.

5. The method of claim 4 wherein a portion of the inorganic sulfate is recovered from the separated stripping solution prior to recycle.

6. The method of claim 1 wherein the stripping solution is acidic.

7. The method of claim 1 wherein the stripping solution is alkaline.

8. The method of claim 1 wherein the stripping solution contains ammonium sulfate and ammonium hydroxide.

9. A method of stripping uranium values from a solution of water-insoluble uranium loaded organic weak base amine solvent extractant for uranium, the solvent extractant for uranium being dissolved in a water-insoluble organic diluent therefor, comprising the steps of intimately contacting the solution of uranium-loaded extractant with a stripping solution consisting essentially of an ammonium sulfate dissolved in water to strip uranium values therefrom and produce stripping solution containing stripped uranium values, the stripping solution being substantially free of a stripping agent for the uranium-loaded solvent extractant selected from the group consisting of water-soluble metal chlorides, nitrates and carbonates, the concentration of the ammonium sulfate in the stripping solution being at least one molar and the stripping solution being at an elevated temperature between about 50° C. and the boiling point when contacted with the solution of uranium-loaded extractant, and separating stripping solution containing stripped uranium values from the extractant.

10. The method of claim 9 wherein uranium values are recovered from the separated stripping solution and the resulting uranium poor stripping solution is recycled.

11. The method of claim 9 wherein the concentration of the ammonium sulfate in the stripping solution is at least 1.5 molar.

12. The method of claim 9 wherein the temperature of the stripping solution is about 50–85° C.

13. The method of claim 12 wherein the concentration of the ammonium sulfate in the stripping solution is at least sufficient to saturate the stripping solution at normal room temperature.

14. The method of claim 13 wherein uranium values are recovered from the separated stripping solution and the resulting uranium poor stripping solution is recycled.

15. The method of claim 14 wherein a portion of the ammonium sulfate is recovered from the separated stripping solution prior to recycle.

16. A method of concentrating uranium values comprising the steps of leaching uranium ore with aqueous sulfuric acid to produce a sulfuric acid leach liquor containing dissolved uranium values, intimately contacting the leach liquor with a solution of water-insoluble organic weak base amine solvent extractant for the uranium values to produce a solution of uranium-loaded extractant, the solvent extractant for uranium being dissolved in a water-insoluble organic diluent therefor, separating the solution of uranium-loaded extractant from the extracted leach liquor, intimately contacting the separated solution of uranium-loaded extractant with a stripping solution consisting essentially of at least one water-soluble inorganic sulfate selected from the group consisting of sodium, potassium, magnesium and ammonium sulfates dissolved in water to strip uranium values therefrom and produce stripping solution containing stripped uranium values, the stripping solution being substantially free of a stripping agent for the uranium-loaded solvent extractant selected from the group consisting of water-soluble metal chlorides, nitrates and carbonates, the concentration of the inorganic sulfate in the stripping solution being at least one molar and the stripping solution being at an elevated temperature between about 50° C. and the boiling point when contacted with the solution of uranium-loaded extractant, and separating stripping solution containing stripped uranium values from the solution of uranium extractant.

17. The method of claim 16 wherein extracted leach liquor is recycled to the leaching step.

18. The method of claim 16 wherein the concentration of the inorganic sulfate in the stripping solution is at least sufficient to saturate the stripping solution at normal room temperature.

19. The method of claim 18 wherein extracted leach liquor is recycled to the leaching step, uranium values are recovered from the separated stripping solution, and the resultant uranium-poor stripping solution is recycled to the stripping step.

20. The method of claim 19 wherein a portion of the inorganic sulfate is recovered from the separated stripping solution prior to recycle.

21. A method of concentrating uranium values comprising the steps of leaching uranium ore with aqueous sulfuric acid to produce a sulfuric acid leach liquor containing dissolved uranium values, intimately contacting the leach liquor with a solution of water-insoluble organic weak base amine solvent extractant for the uranium values to produce a solution of uranium loaded extractant, the solvent extractant for uranium being dissolved in a water-insoluble organic diluent therefor, separating the solution of uranium-loaded extractant from the extracted leach liquor, intimately contacting the separated solution of uranium-loaded extractant with a stripping solution consisting essentially of an ammonium sulfate dissolved in water to produce stripping solution containing stripped uranium values, the stripping solution being substantially free of a stripping agent for the uranium-loaded solvent extractant selected from the group consisting of water-soluble metal chlorides, nitrates and carbonates, the concentration of the ammonium sulfate in the stripping solution being at least one molar and the stripping solution being at an elevated temperature between about 50° C. and the boiling point when contacted with the solution of uranium-loaded extractant, and separating stripping solution containing stripped uranium values from the solution of uranium extractant.

22. The method of claim 21 wherein extracted leach liquor is recycled to the leaching step.

23. The method of claim 21 wherein the concentration of the ammonium sulfate in the stripping solution is at least 1.5 molar.

24. The method of claim 21 wherein the temperature of the stripping solution is about 50–85° C.

25. The method of claim 24 wherein the concentration of the ammonium sulfate in the stripping solution is at least sufficient to saturate the stripping solution at normal room temperature.

26. The method of claim 25 wherein extracted leach liquor is recycled to the leaching step, uranium values are recovered from the separated stripping solution and the resultant uranium poor stripping solution is recycled to the stripping step.

27. The method of claim 26 wherein a portion of the sulfate is recovered from the separated stripping solution prior to recycle.

References Cited in the file of this patent
UNITED STATES PATENTS

| | | |
|---|---|---|
| 2,743,157 | Hagemann et al. | Apr. 24, 1956 |
| 2,864,667 | Bailes et al. | Dec. 16, 1958 |
| 2,877,250 | Brown et al. | Mar. 10, 1959 |

OTHER REFERENCES

Kaufman et al.: "ACCO–68," pp. 5–14, 36–41 (1954).

Grinstead et al.: "Proceedings of the International Conference on the Peaceful Uses of Atomic Energy," vol. 8, pp. 49–53, August 8–20, 1955.

Crouse et al.: "ORNL–1959," pp. 4–9, 18–24, 40–57, September 30, 1955.

Pruess et al.: "RMO–2533," pp. 6, 7, 18, 19, 24, and 25, December 14, 1955.

Petrow et al.: "WIN–61," pp. 6–10, 13–19, 34 and 35, August 26, 1957.

Mining Eng., vol. 9, No. 9, pp. 973–981, 997–1000, September 1957.

Bruce et al.: "Process Chemistry," vol. 2, pp. 6–15, 32–34 (1958).

Crouse et al.: ORNL–1959, pp. 25, 30, 37, September 1957.

UNITED STATES PATENT OFFICE
CERTIFICATE OF CORRECTION

Patent No. 3,115,388 December 24, 1963

Mayer B. Goren

It is hereby certified that error appears in the above numbered patent requiring correction and that the said Letters Patent should read as corrected below.

Column 5, line 54, for "solven" read -- solvent --; column 6, line 2, for "wel" read -- well --; column 11, line 40, for "often" read -- of ten --.

Signed and sealed this 16th day of June 1964.

(SEAL)
Attest:

ERNEST W. SWIDER
Attesting Officer

EDWARD J. BRENNER
Commissioner of Patents